April 8, 1969
L. C. RATHBURN
3,437,581
ELECTRIC EMULSION TREATER FOR CRUDE OIL
Original Filed March 23, 1964
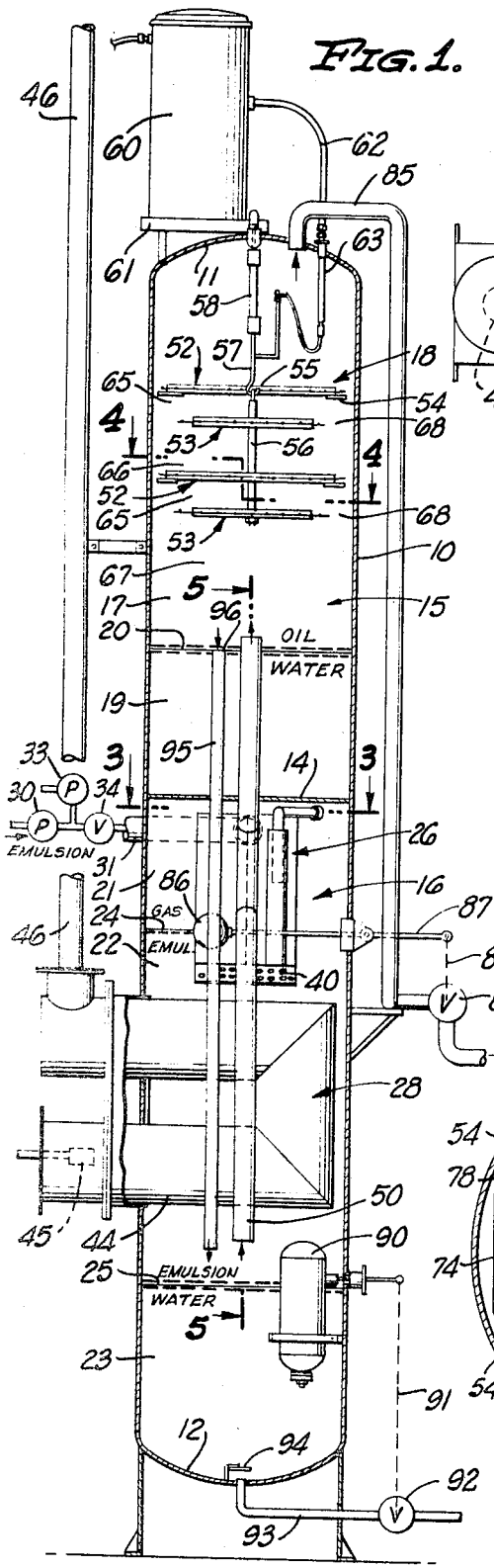
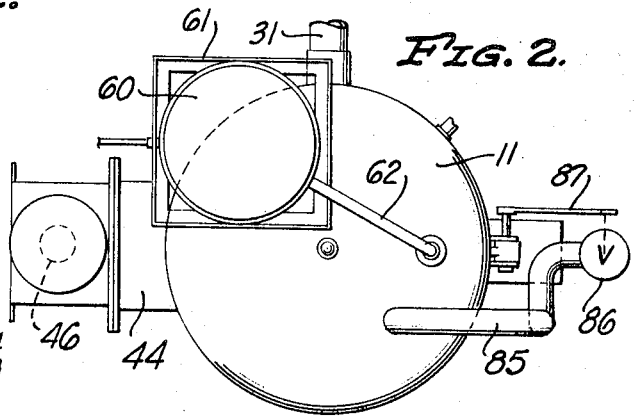
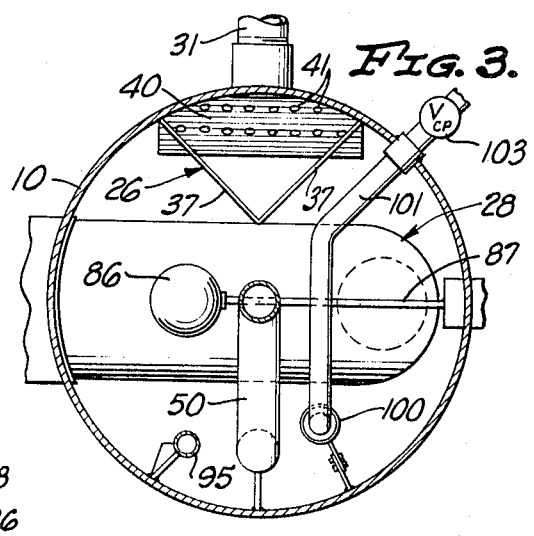
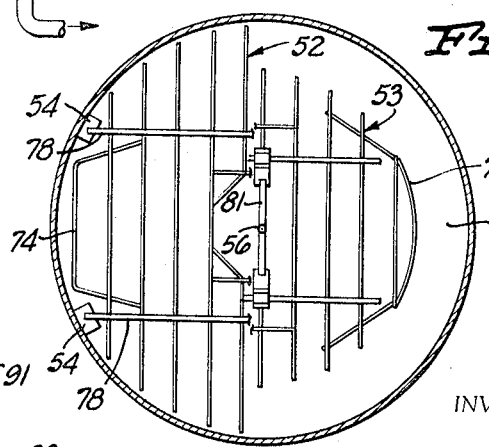
INVENTOR.
LLOYD C. RATHBURN
BY HIS ATTORNEYS
HARRIS, KIECH, RUSSELL & KERN

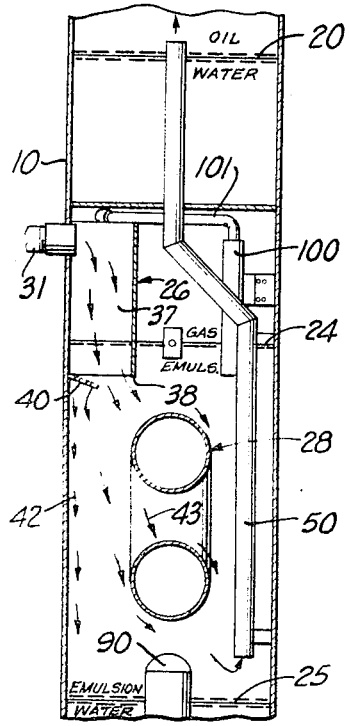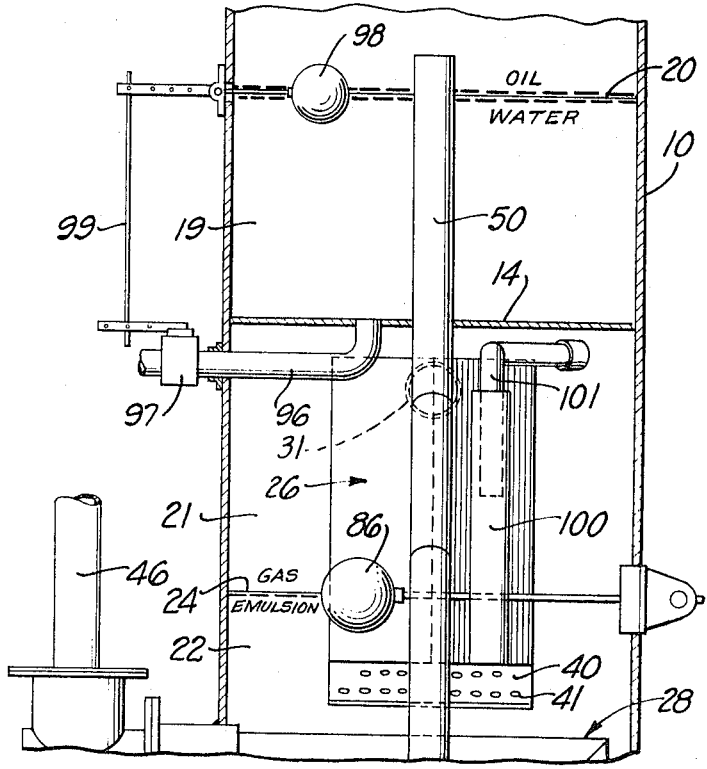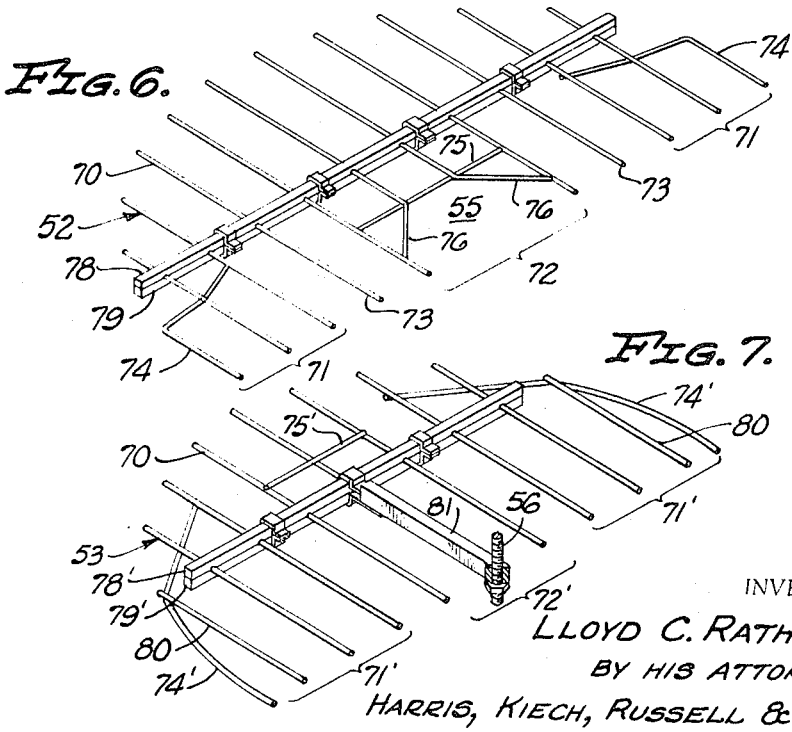

United States Patent Office 3,437,581
Patented Apr. 8, 1969

3,437,581
ELECTRIC EMULSION TREATER FOR CRUDE OIL
Lloyd C. Rathburn, Pasadena, Tex., assignor, by mesne assignments, to Combustion Engineering, Inc., a corporation of Delaware
Continuation of application Ser. No. 354,021, Mar. 23, 1964. This application July 31, 1967, Ser. No. 657,427
Int. Cl. B03c 5/02; C10g 33/02
U.S. Cl. 204—308    6 Claims

ABSTRACT OF THE DISCLOSURE

A dehydrator of oil field emulsions has a cylindrical shell extended vertically. A heat source is mounted in the shell to heat the incoming emulsion after it has been degassed to an extent. An electrical section is mounted within the shell to generate an electrostatic field through which the heated emulsion is passed to coalesce water.

---

This application is a continuation of previously filed application, Serial No. 354,021 filed March 23, 1964, now abandoned.

This invention relates to the electric treatment of emulsions of the water-in-oil type and particularly to those oil-continuous emulsions containing gases and a dispersed water phase. The continuous phase of such an emulsion may be a crude oil or other hydrocarbon of relatively high resistivity. The dispersed phase is usually aqueous and when separated will be referred to herein merely as water irrespective of purity or salt content, it being understood that the term is inclusive of the brine found in crude oils and the aqueous material of other emulsions.

The invention is particularly effective in treating crude oil emulsions as they are produced from the well. The dispersed phase of these or other emulsions is often composed of some free water that will separate by gravity and some emulsified water that will not readily settle but which must be destabilized and/or coalesced into larger masses before separation from the oil will take place. Such free water is desirably separated before the residual emulsion is subjected to the emulsion-resolving action of an electric field.

Many emulsions also contain dissolved or entrained gases which are desirably separated therefrom before subjection to the action of an electric field. An example is the crude oil emulsions produced from wells which often contain entrained gases or which will liberate such gases upon reduction in pressure, heating or subjection to other processing steps.

It is an object of the invention to provide an inexpensive electric dehydrator of simple construction that can operate for long periods of time without supervision and that will satisfactorily separate gas and/or water from such emulsions. Specifically, it is an object of the invention to provide a tall upright dehydrator of this type which occupies a minimum of floor area and in which initial separation of gas and/or free water is effected in one end of the vessel and electric treatment is effected in a main treating chamber at the other end of the vessel. There are advantages irrespective of whether the treating chamber is uppermost but such an arrangement will be exemplified as it permits placement of the electrical energizing means at the upper end of the vessel so as to be out of reach and thus not represent a safety hazard.

A further object of the invention is to prvoide for sequential gas separation, heating and electric treatment in separate zones of the dehydrator. Another object is to subject the incoming emulsion from which gas has been separated to an initial settling action to separate free water therefrom before or during the heating. Still a further object is to stratify the influent emulsion into superimposed bodies of gas, emulsion and water before moving a stream of the emulsion from the emulsion body into a main treating chamber for treatment in a high-voltage electrostatic field. Other objects reside in the manner in which such emulsion is conducted into such main treating chamber and the manners in which separated water may be withdrawn from two bodies thereof within the container of the dehydrator. Still other objects reside in the control of effluents from the dehydrator in response to changes in level of interfaces therein; also in the provision of a novel electrode construction for this or similar electric treaters.

Other objects and advantages of the invention reside in the internal partitioning of a tall upright container to provide various zones or chambers in which the different functions noted above can be performed. Still further objects and advantages of the invention will be evident to those skilled in the art from the following description of exemplary embodiments of the invention.

Referring to the drawings:

FIG. 1 is a somewhat diagrammatic vertical sectional view of one embodiment of the invention;

FIG. 2 is a top view of the treater of FIG. 1;

FIGS. 3, 4, and 5 are sectional views taken along corresponding lines of FIG. 1;

FIG. 6 is a fragmentary perspective view of an upper grounded electrode of the invention;

FIG. 7 is a fragmentary perspective view of a lower energized or live electrode of the invention; and FIG. 8 is a fragmentary vertical sectional view of an alternative embodiment of the invention.

The electric dehydrator or gas-water separator of FIG. 1 includes a tall upright container 10, usually cylindrical, closed at its upper and lower ends by upper and lower heads 11 and 12. A horizontal partition 14 is shown as dividing the interior of the container into a main treating chamber 15 and a pre-treating chamber 16 respectively on opposite sides of the partition, the pre-treating chamber receiving the influent emulsion and separating some of its constituents before delivery to the main treating chamber.

The main treating chamber 15 provides an oil-continuous zone containing a body of emulsion 17 undergoing treatment and settling as induced by the coalescing action of an electrode means 18 to be described. At the bottom of the main treating chamber 15 is a water-continuous zone containing a body of water 19 forming with the emulsion body 17 an oil-water interface 20 in a shallow interfacial zone of the main treating chamber. The body of water 19 is composed largely of water that has been coalesced by the electrode means 18 and which has gravitated from the emulsion.

The upper portion of the pre-treating chamber 16 provides a gas-separation zone or chamber. This pre-treating chamber is adapted to contain superimposed bodies of gas 21, emulsion 22 and water 23 in respective gas, emulsion and water zones thereof, these three bodies forming as a result of preliminary separation of the constituents of the incoming emulsion in the pre-treating chamber. The gas body 21 and the emulsion body 22 are in contact at a gas-emulsion interface 24 in the gas-separation zone. The emulsion body 22 and the water body 23 are in contact at an emulsion-water interface 25 in a shallow interfacial zone near the bottom of the container 10. There is also a free-water-separation zone in the pre-treating chamber 16 within and below a baffle structure 26 to be described, functioning to separate free water from the emulsion. A heating means 28 is disposed in a heating zone of the pre-treating chamber 16 between the interfaces 24 and 25. The partition 14 separates the gas body 21 and the water body 19 in heat-transfer relation.

The invention provides means for establishing a fluid flow in the container that is into the gas-separating zone, substantially vertically through the heater zone, upwardly in the main treating chamber 15 and from the upper end of such chamber. This flow is established by a pressured influent stream of the emulsion to be treated.

Referring particularly to FIG. 1 the influent emulsion can be pressured by a pump 30 and delivered to an emulsion influent pipe 31. If desired a small amount of a chemical demulsifying agent can be pumped into the emulsion by a pump 33 and mixed therewith by any suitable means such as a mixing valve 34. The emulsion influent pipe 31 opens laterally on the gas-separating chamber 16 near the upper end thereof, preferably into an inlet space provided by the baffle structure 26.

The baffle structure 26 includes an upright housing exemplified in FIGS. 1, 3, and 5 as having angular sides 37 meeting right-angularly with their edges welded or otherwise secured to the inner wall of the container 10. The upper ends of the sides 37 terminate below the partition 14 and above the gas-emulsion interface 24. The lower ends of these sides terminate in a lip 38 (FIG. 5) below the gas-emulsion interface 24. The inlet space between the sides 37 and the container thus opens upwardly on the body of gas 21 in the gas zone and downwardly on the body of emulsion 22 in the emulsion zone. The emulsion influent pipe 31 opens on this inlet space between the ends thereof, preferably close to the upper end. Initial separation of gas and free water takes place in this inlet space. A portion of the downflow therein is preferably deflected inwardly of the container by use of a baffle 40 which angles downwardly and inwardly of the container below the lip 38 and which extends across at least a portion of the lower end of the baffle structure 26 as shown in FIG. 5. This baffle provides apertures 41 through which some of the initially separated free water and some of the emulsion may drop. The free water continues to separate from the emulsion in a vertical zone immediately within the container 10 at one side thereof and drops to the emulsion-water interface 25 as indicated by the arrows 42 without being heated substantially by the heating means 28. The baffle deflects much of the emulsion from which some free water has separated toward the inner boundary of such a vertical zone to flow downward close to the heating means 28 as indicated by the arrows 43.

The heating means 28 preferably includes a U-shaped heater housing looping inwardly from the container between the interfaces 24 and 25. The legs of the housing are preferably oriented vertically and suitable combustible products are delivered to a burner 45 to burn in the lower leg, the products of combustion being progressively cooled by heat transfer to the surrounding emulsion as these products of combustion flow along the housing before discharge into a stack 46 rising to a position above the container 10. The influent emulsion from which much of the free water and entrained gases have separated is thus moved into contact with areas of the burner housing 44 that are of increasing temperature. The heating induces additional separation of free water and gas. As the heater zone opens upwardly toward the gas body 21 and downwardly toward the water body 23 any gases or water freed by the heating can rise and fall respectively to these bodies.

It is desirable that the flow-establishing means should move the emulsion substantially vertically through the heater zone between positions at different levels therein. In the embodiment exemplified the emulsion enters the heater zone at an upper position and is withdrawn at a lower position determined by the lower end of an emulsion conduit 50 providing a passage means which opens a short distance above the emulsion-water interface 25. The heated or preliminarily separated emulsion flows upwardly in the passage means of the emulsion conduit 50 to discharge from the upper end thereof at a position substantially above the partition 14 and slightly above the oil-water interface 20 within the main treating chamber 15. The emulsion conduit 50 may extend internally or externally of the container 10 but preferably is entirely therewithin. As shown, the emulsion conduit 50 has offset lower and upper portions so that the lower portion may extend between the heater housing 44 and the container while the upper portion extends centrally through the partition 14 in fluid-tight relationship therewith. It is very desirable that the emulsion flowing from the top of the emulsion conduit 50 should be immediately subjected to a high-voltage coalescing electric field established between the electrode means 18 and the body of water 19 thus effecting a preliminary electric treatment before the residual emulsion rises through the electrode means.

The electrode means 18 best accomplishing the desired treatment is shown in FIGS. 1, 4, 6, and 7. Referring thereto, two sets of electrodes are shown each composed of an upper grounded electrode 52 and a lower live or energized electrode 53. The grounded electrodes 52 are supported by brackets 54 which electrically connect them to the container 10. These grounded electrodes provide central openings 55 through which depends a suspension means for the energized electrodes 53. The latter includes a rod 56 electrically connecting the electrodes 53 and hung from a hook member 57 suspended from an insulator 58 connected to the upper head 11. The electrodes 53 are maintained at a high potential above ground by use of a high-voltage power source 60, usually a step-up transformer mounted on a platform 61 above the upper head 11 and equipped with suitable current-limiting means known in the art. One high-voltage terminal is grounded to the container 10 and the other high-voltage terminal is connected through a sheathed high-voltage cable 62 and an inlet bushing 63 to the hook member 57 as shown. With this electrode arrangement high-voltage coalescing electric fields are established in main treating spaces 65 between the electrodes of each pair, in an intermediate treating space 66 between the live electrode 53 of the upper pair and the grounded electrodes 52 of the lower pair, in a pretreating zone 67 between the lowermost live electrodes 53 and the body of settled coalesced water 19 providing the aforesaid preliminary electric treatment, and in the zones 68 between the container and the sides of each live electrode 53. It should be understood however that the invention is not limited to such an elaborate electrode means. In some instances a single electrode set may be used or even a single energized or live electrode 53 without a grounded counterpart in which latter event treatment will be in zones below, above and at the sides of the live electrode.

Each of the electrodes 52 and 53 is preferably a horizontal grid electrode made up of a plurality of interconnected bars or rods 70 of round, square or rectangular cross section, hereinafter referred to merely as rods for purpose of simplicity. As shown, these rods 70 are assembled into electrode sections supported and oriented by a suitable clamp means. For example each upper or grounded electrode 52 is made up of identical outermost electrode sections 71, a central electrode section 72 and intermediate rod-sections 73, see FIG. 6. Each outermost section 71 provides at least two parallel rods connected by a loop rod 74 welded or otherwise secured thereto, the loop rod extending laterally beyond the parallel rods toward the inner wall of the container. The central section 72 is composed of several of the parallel rods 70 with those toward the center being foreshortened and joined to a transverse rod 75 and diagonal rods 76 to provide the opening 55. Upper and lower clamp bars 78 and 79 are suitably clamped, bolted or welded together. For example they can be held together by the illustrated bolt-tightened straps or directly by bolts extending therethrough. These clamp bars provide aligned notches to receive and clamp the parallel rods of all of the electrode sections. These electrode sections are small enough to be moved through a manhole of the container (not shown) and assembled in the main treating chamber 15. It will be noted that each of the electrode sections 71 and 72 has at least two rods extending between each pair of clamp bars 78 and 79 to provide rigidity and a support arrangement in which all of the parallel rods lie substantially in the same plane. The loop rods of the outermost sections extend outwardly beyond the outermost parallel rod and lie close to the inner wall of the container 10.

The lower or energized electrodes 53 are each formed similarly, as suggested in FIG. 7. Here each outermost section 71' has two rods clamped between the clamp bars 78' and 79' with a third outboard rod 80 welded or otherwise connected directly to the loop rod 74'. The center electrode section 72' contains three rods joined by a transverse rod 75' with the center rod being foreshortened to provide space for a support arm 81 adjustably secured to the vertical support rod 56. The ends of the parallel rods 70 and the loop rods 74' constitute the outer portions of each energized electrode and are positioned in spaced relationship with the inner wall of the container, providing the aforesaid treating zones 68 therebetween (FIGS. 1 and 4).

The treated oil from which the electrically coalesced water has settled is withdrawn from the upper end of the main treating chamber 15 through a treated-oil effluent means shown as including a pipe 85 containing a valve 86 which maintains a back pressure throughout the container 10. This valve is preferably controlled in response to changes in level of the gas-emulsion interface 24. As shown, a float 86 is operatively connected to an arm 87 which in turn is operatively connected through a connection 88 to the valve 86.

The emulsion-water interface 25 is desirably maintained at a uniform level a short distances below the bottom of the emulsion conduit 50. To accomplish this any suitable level-responsive means can be used. This is exemplified as a float 90, weighted to sink in the emulsion and be buoyant in the water. The level-responsive means is operatively connected through a connection 91 to a valve 92 in a water effluent pipe 93 having its inlet protected by a superposed disc 94. Water and any solids carried by the emulsion can thus be removed from the bottom of the container 10.

The oil-water interface 20 should likewise be maintained at a substantially constant level, preferably a short distance below the top of the emulsion conduit 50. In the embodiment of FIG. 1 this is accomplished by use of an upright water conduit 95 having an upper intake end providing an overflow lip 96 adjacent the desired position of the interface. This lip acts as a skimmer permitting any water thereabove to drop through the water conduit 95 into the lower interior of the container 10. Preferably the lower end of this pipe traverses the heater zone and terminates below or above the emulsion-water interface 25. The preferred arrangemnt terminates the lower end of the pipe 95 above this interface at approximately the same level as the bottom of the emulsion conduit 50. Coalesced water from the body 19 thus drops through the pipe 95 and discharges as a stream to join the body of separated water 23 for ultimate withdrawal through the water effluent pipe 93.

A less simple but often preferred means for withdrawing coalesced water from the body 19 is shown in FIG. 8. Here a second or separate water effluent pipe 96 opens on the bottom of the body of coalesced water 19 and extends laterally through the container 10 to a valve 97. A means responsive to changes in the level of the oil-water interface 20 is operatively connected to the valve 97, being shown as a float 98 connected by a rod or other operative connection 99 to the valve 97. This arrangement is preferred as providing a better lower boundary for the preliminary treating field between lower live electrode 53 and the body of coalesced water 19. The system is also self-flushing as concerns any mud or solids that may separate from the emulsion in the main treating chamber 15 as these are directly removed with the water effluent.

Gas is removed from the body of gas 21 in both embodiments of the invention by a gas effluent means best shown in FIGS. 1, 3, 5, and 8. This includes a gas effluent housing shown as including a short length of pipe 100 with its upper and lower ends opening respectively above and below the gas-emulsion interface 24. The lower end of a smaller gas-effluent pipe 101 depends inside the pipe 100 and opens interiorly thereon at a lever above this interface. With this arrangement a portion of the gas-emulsion interface will be present inside the pipe 100 at the same level as the interface exterior thereof. Any liquid particles or condensate in the effluent gas will thus drop to the interface in the pipe 100. Such effluent gases move downward in the pipe 100 in the space around the pipe 101 and upward therein to a position outside the container where they are throttled by a constant-pressure valve 103 (FIG. 3).

As an example of the operation of the invention a well-produced crude oil emulsion containing gases and about 34.0% dispersed water was introduced at a temperature of about 40° F. through the influent pipe 31 after addition of a small amount of a widely used chemical demulsifying agent. The gases and the free water separated in the pre-treating chamber 16. The effluent emulsion therefrom heated to a temperature of about 100° F. moved upward into the main treating space 15 containing oppositely poled electrodes spaced 4 inches apart with the lowermost live electrode being about 18 inches above the oil-water interface 20. An A.C. potential difference of about 16,500 volts was applied between the electrodes 52 and 53 by use of the step-up transformer 60. The treated oil effluent contained only about 0.4% residual water.

For purpose of simplicity in description the foregoing material refers to various "interfaces." In all instances and particularly as concerns the interfaces 20 and 25 these interfaces may be zones of transition between water-continuous and oil-continuous systems, often being shallow zones containing sludge or components undergoing separation, all as distinct from a planar junction of bodies of water and emulsion or oil. This is well understood in the art.

Various changes and modifications can be made without departing from the spirit of the invention as defined in the appended claims.

The invention having been described, what is claimed is:

1. Processing apparatus for oil well production, including in combination,
   a tall upright container including a gas-separating chamber above a heater chamber,
   an inlet connected to the gas-separating chamber for delivery of a stream of oil well production containing gases and an emulsion containing a dispersed water phase, some of the gases separating from the stream in the gas-separating chamber to form therein superimposed bodies of gas and emulsion,
   an arrangement providing flow of the emulsion downward to the heater chamber,
   a heater mounted in the heater chamber and including a housing arranged to heat the emulsion and extend transversely of the upright container substantially from wall to wall, gas evolved from the heated emulsion being conducted to the body of gas above the emulsion,
   means for withdrawing from the gas body the gases evolved in the gas-separating chamber and in the heater chamber, a main treating chamber in the upright container above the heater chamber, means for establishing a high-voltage emulsion-treating electric field in the main treating chamber, including horizontal foraminous electrodes adapted to be submerged in liquid which fills the main treating chamber, an emulsion conduit means for conducting heated emulsion from the heater chamber upward to a position below said foraminous electrodes, the heated emulsion rising through the foraminous electrode means and their high-voltage electric field for treatment therein, an outlet for withdrawing the water from the upright container separated from the heated emulsion in the main treating chamber following electric treatment therein; and an outlet for withdrawing treated oil from the upper interior of the main treating chamber.

2. The processing apparatus of claim 1 in which emulsion from the body of emulsion in the gas-separating chamber enters the heater chamber at one level and flows vertically to leave at another level, and the heater housing is formed from a large U-shaped tube with its legs extending inward from one wall of the upright container and with the bight of the U-shaped tube disposed relatively close to the opposite wall of the upright container, the legs of the housing being superposed one above the other with both legs being between the different levels in the heater chamber.

3. The processing apparatus of claim 1 in which the oil well production contains free water, and including means for separating the free water from the oil well production before the heated emulsion is delivered to the electric field through the emulsion conduit means and for collecting the free water in a body of water in the bottom of the container from which the free water is withdrawn through the water outlet.

4. The processing apparatus of claim 3 including a conduit connected to the main treating chamber, the conduit extending downward in the upright container to conduct separated water to the bottom of the container to mingle this water with the separated free water for conjoint removal through the water outlet means.

5. Processing apparatus for oil well production, including in combination, a tall upright container including a gas-separating chamber above a heater chamber, and a main treating chamber above the heater chamber, vertical passages within the upright container for fluid flow from the gas-separating chamber, through the heater chamber, upwardly in the main treating chamber and from the upper end of the latter, an inlet connected to the gas-separating chamber for delivery of a pressured stream of the oil well production containing gas, gas separating from the stream in the gas-separating chamber to form superimposed bodies of gas and emulsion, the heater chamber arranged to communicate with the body of emulsion to receive emulsion therefrom under the pressure of incoming production, free water separating and collecting in the bottom of the upright container, a heater mounted in the heater chamber for heating the emulsion, gas evolved from the heated emulsion being conducted to the body of gas above the emulsion, means establishing a high-voltage emulsion-treating electric field in the main treating chamber, including electrodes adapted to be submerged in liquid and mounted in the main treating chamber, the vertical passages including dual conduits comprising (1) a first conduit (within an intermediate section of the container) opening at one end on the heated oil in the heating chamber and opening at its other end on the main treating chamber below the electrode means to conduct the heated emulsion thereto and (2) a second conduit (within and traversing the intermediate section of the container and) comprising a downcomer pipe open at its lower end on the lower portion of the main treating chamber to receive water coalesced by the electric field and settling from the emulsion in the treating chamber, the downcomer pipe being open at its lower end toward the body of separated water to conduct the coalesced water to the body of separated water, the conduit means physically separating the heated emulsion flowing to the electrode means from the coalesced water dropping to the body of water, an outlet for treated oil connected to the upper interior of the main treating chamber to conduct treated oil therefrom, an outlet for withdrawing from the body of gas the gases evolved from the oil well production in the gas-separating chamber and in the heater chamber, and an outlet for water connected to the lower portion of the container for withdrawing the free water separating from the oil well production and the water coalesced by the field.

6. The processing apparatus of claim 5 in which the heater chamber is arranged directly below the gas-separating chamber and opens upwardly thereon to receive a downward flow of the emulsion from which gas has separated in the gas-separating zone, the downcomer pipe having an open lower end below the heater to establish an upward flow of emulsion in the heater chamber, both the first conduit and the downcomer pipe of the second conduit traversing the heating chamber and the heater therein.

References Cited

UNITED STATES PATENTS

| 2,855,359 | 10/1958 | Woelflin | 204–286 |
| 3,148,133 | 9/1964 | Turner | 204–306 |
| 3,205,161 | 9/1965 | Turner | 204–308 |
| 3,207,686 | 9/1965 | Jarvis et al. | 204–302 |
| 3,255,571 | 6/1966 | Walker et al. | 204–308 |

JOHN H. MACK, *Primary Examiner.*

T. TUFARIELLO, *Assistant Examiner.*

U.S. Cl. X.R.

55—9, 175; 204—302